(12) United States Patent
Hinton et al.

(10) Patent No.: US 8,344,290 B1
(45) Date of Patent: Jan. 1, 2013

(54) SPRAY BOTTLE FLUID HEATING SYSTEM HAVING THERMOSTATIC CONTROL AND AUTOMATIC CONDENSATE RECOVERY

(76) Inventors: Debra S. Hinton, Port Townsend, WA (US); Joshua W. Kinney, Port Townsend, WA (US)

(*) Notice: Subject to any disclaimer, the term of this patent is extended or adjusted under 35 U.S.C. 154(b) by 334 days.

(21) Appl. No.: 12/776,628

(22) Filed: May 10, 2010

Related U.S. Application Data

(60) Provisional application No. 61/177,513, filed on May 12, 2009.

(51) Int. Cl.
F27D 11/00 (2006.01)
(52) U.S. Cl. .......................... 219/433; 219/429; 219/432
(58) Field of Classification Search .................. 219/428, 219/429
See application file for complete search history.

(56) References Cited

U.S. PATENT DOCUMENTS

| | | | |
|---|---|---|---|
| 1,762,171 A | 6/1930 | Goldsmith | |
| 2,700,097 A | 1/1955 | Morey | |
| 3,454,745 A | 7/1969 | Stone | |
| 4,011,992 A | 3/1977 | Olsen | |
| 5,472,119 A | 12/1995 | Park et al. | |
| 5,700,991 A | 12/1997 | Osbern | |
| 5,786,573 A | 7/1998 | Fabrikant et al. | |
| 5,941,078 A | 8/1999 | Scudder et al. | |
| 5,960,998 A | 10/1999 | Brown | |
| 6,817,202 B1 | 11/2004 | Anthony | |
| 2006/0021511 A1 | 2/2006 | Paasch et al. | |
| 2007/0131676 A1 | 6/2007 | Clothier et al. | |

FOREIGN PATENT DOCUMENTS

GB 2435404 A 8/2007

OTHER PUBLICATIONS http;//products.howstuffworks.com/euro-pro-shark-steam-bottle-sc618-review.htm; Euro-Pro Shark Steam Bottle SC618, website, May 21, 2010.
http://chefschoice.com.html; website, May 21, 2010, Model 688, Model 677, Model 678, electric kettles; Model 675 electric hot pot; model 685 electric teakettle; model 679 glass kettle; model 695 electric french press.

*Primary Examiner* — Cheung Lee
(74) *Attorney, Agent, or Firm* — Jacques M. Dulin, Esq; Innovation Law Group, Ltd

(57) ABSTRACT

A robust, insulated, double walled, trigger-type spray bottle having a heating element built-into the bottle to heat water. The bottle is received in a power base having pin/ring connections to provide power only when the bottle is on the base. Sensors control the temperature of water in the bottle and cut off power to the heater if it begins to overheat. A hot water/steam vapor condensate and recycle tube prevents steam build-up in the bottle, and the condensate is led through a drip tube to a collection tray in the base. The recycle tube includes a spring-biased valve so that when the bottle is picked-up there is no drip of hot water. The valve is actuated by a rib and gutter system that permits the bottle to be placed on the base in any orientation, yet will drain. The double wall of the bottle insulates the user's hand.

10 Claims, 12 Drawing Sheets

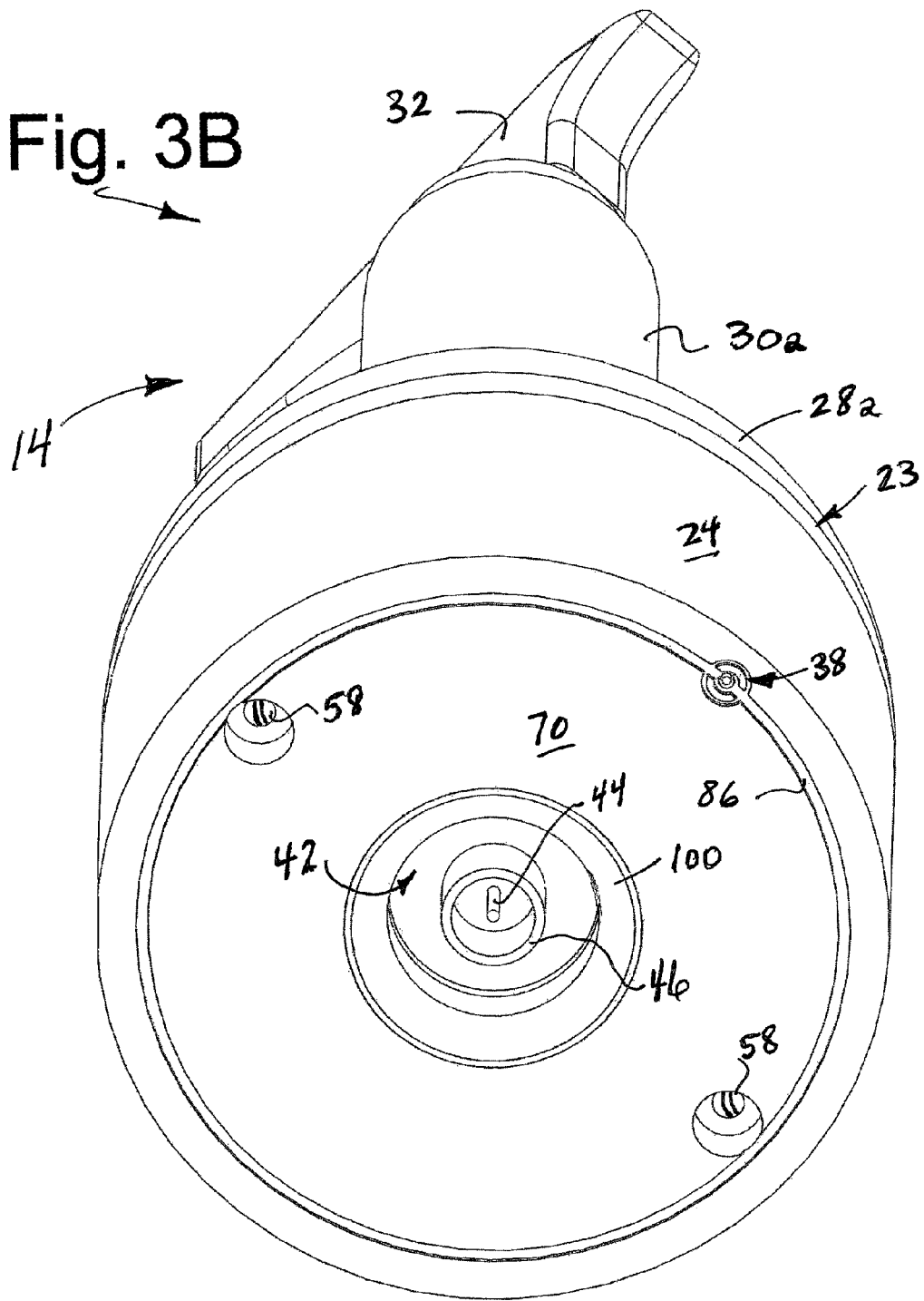

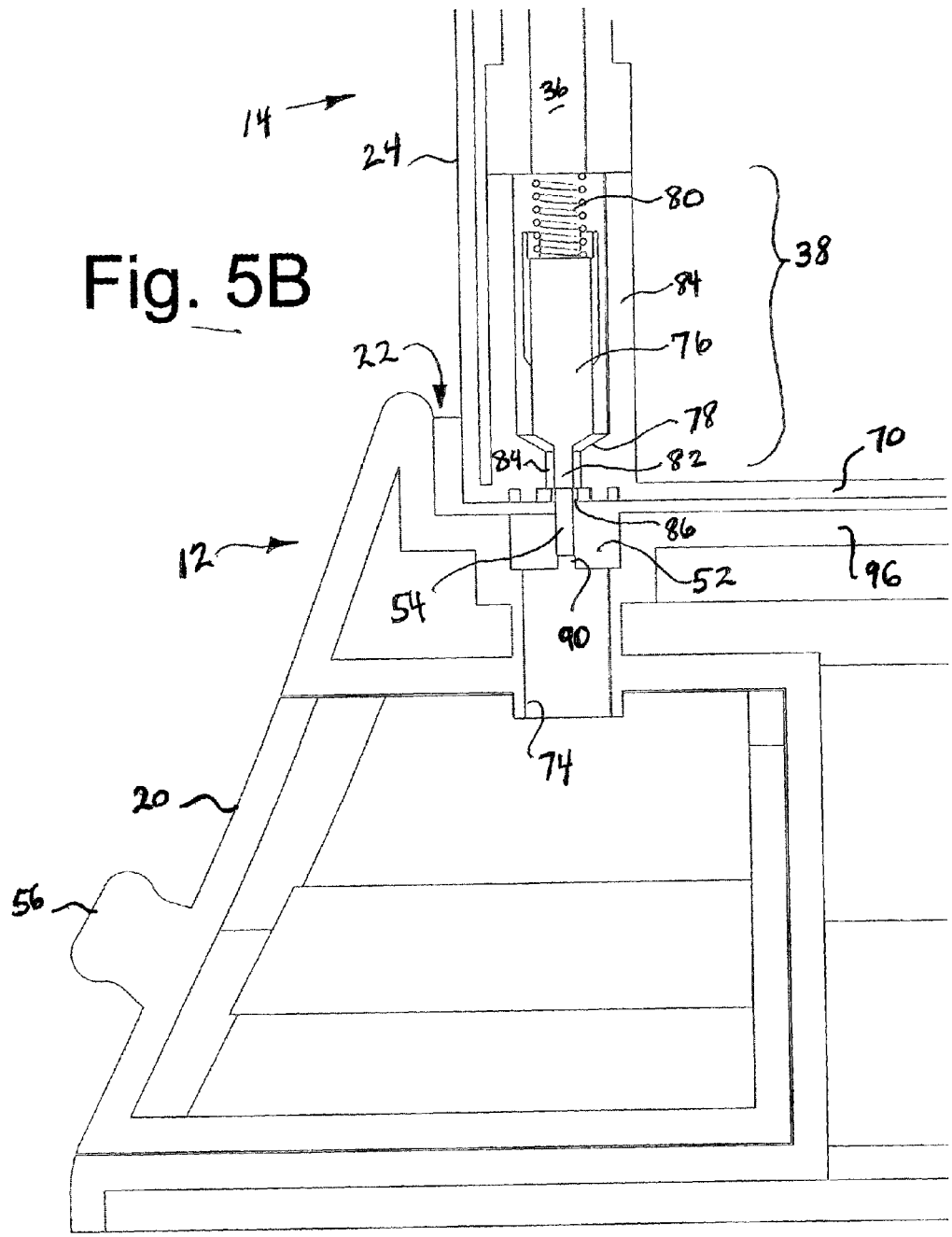

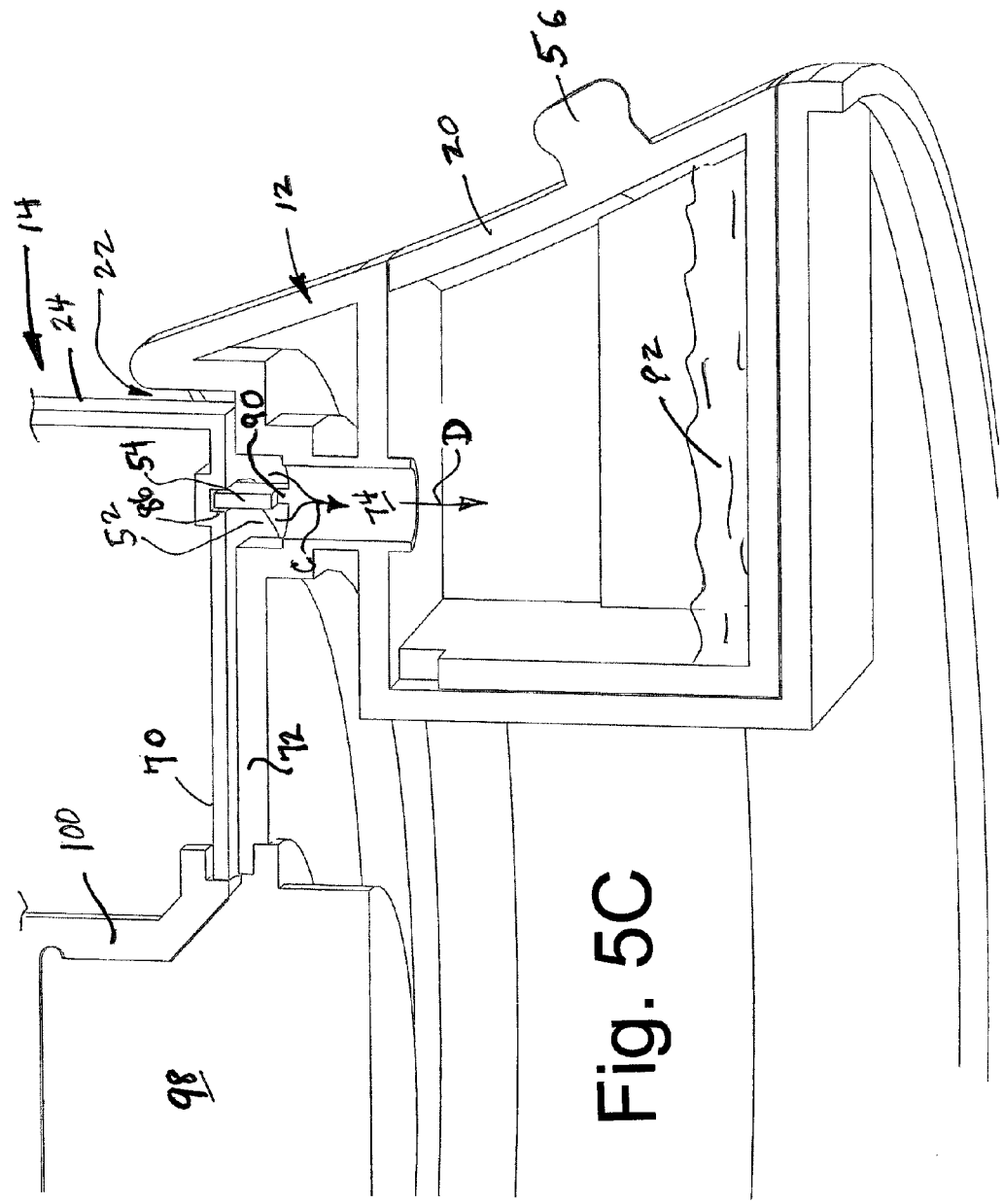

SPRAY BOTTLE FLUID HEATING SYSTEM HAVING THERMOSTATIC CONTROL AND AUTOMATIC CONDENSATE RECOVERY

CROSS-REFERENCE TO RELATED APPLICATION

This is the Regular US Patent Application corresponding to Provisional Application Ser. No. 61/177,513 under the title Spray Bottle Heater System, filed by the same inventors on May 12, 2009, the priority of which application is hereby claimed under Title 35, US Code, sections 111ff.

FIELD

The invention is directed to a spray bottle dispenser with a built-in heating element to heat the water to a desired temperature for dispensing a warm but not scalding or otherwise unsafely hot spray. It is particularly useful in the field of cosmetology, in association with hair cutting and styling, where warm and hot, but not scalding water is used to assist in handling hair, permitting it to lay better for cutting, and to assist in coloring and setting hair, being an adjuvant for hair treatment compositions.

BACKGROUND

Cosmetologists and barbers spray the customer's hair during certain types of cutting with warm water to assist in the cutting, cleaning, curling, etc procedures. Currently they fill a simple plastic bottle with warm water and spray. However, the water cools rapidly and comes out cold. Further, even warm water feels cool when sprayed on skin, as adiabatic expansion cools the spray rapidly. Also, altitude affects (cools) the temperature of the resultant spray.

To get the water to come out warm enough, nearly boiling water must be used. However, the barber's station does not provide near-boiling water, and standard polyethylene bottles will not withstand boiling water. There is also the hazard of spills, and the neck of the bottle becoming so hot as to not be able to be handled by the barber.

Accordingly, there is an unmet need for barber and cosmetologist's hot water spray bottle that includes a heating element that automatically heats water to near boiling, yet does not collapse the bottle material from the heat, does not overheat to either melt the bottle or create steam that would scald the customer or burn the hand of the cosmetician, that is light weight, and is easy to use.

SUMMARY INCLUDING OBJECTS AND ADVANTAGES

The invention is directed to the use of a robust, insulated, double-walled spray bottle that has a heating element built-into the bottle to heat water. The bottle is fitted with a threaded standard trigger type sprayer at the top of an elongated neck, and includes a temperature-resistant dip tube. The bottle fits into a base having a recess that includes a female electrical connector that mates with male electrical prongs on the bottom of the bottle. The electrical connector arrangement can be reversed; male prongs in the base and female connectors in the bottle. Temperature limit sensor and switch elements are used, one to sense the temperature of the water in the bottle and to manage power to heater so as to maintain the water at the proper temperature, and a second, safety sensor associated with the heating element to cut off power to the heater to prevent it from overheating.

The heater element is contained in the bottom of an inner bottle and is preferably a high wattage, rapid heating unit. The first sensor switch trims the heater to prevent it from "cooking" itself, that is overheating, and the second switch sensor shuts the heater off when the water temperature is reached. Preferably the second switch sensor cycles the heating element ON and OFF to maintain the water temperature within a user-selected, preset, relatively narrow range, e.g. 180-190° F.

The double-walled bottle comprises an inner and an outer bottle. Spaced outwardly of the inner bottle is the outer bottle of coordinate shape, and the gap between them provides air insulation to maintain the outer surface of the bottle cool. Adjacent the top of the neck of the inner bottle and communicating interior of the inner bottle is a steam pressure and vapor relief tube. This tube leads down the outside of the inner bottle and is disposed in the gap formed by the enclosing outer bottle. While some of the heated, near boiling vapor condenses on the inner wall of the inner bottle and runs back down into the base of the bottle, steam vapor can exit the bottle through the aperture in the inner bottle wall that communicates into the pressure relief tube, a safety feature.

The bottom of the condensate tube includes a spring-biased valve that is actuated by a projecting rib and channel element (a gutter) in the base unit. The gutter channel leads to a drain that funnels condensate into a removable water condensate tray in the base. When the bottle is lifted off the base, the spring-biased valve closes and the steam relief tube will not drip water, hot water or steam. When the bottle is replaced onto the base, the rib pushes the valve stem upwardly, permitting condensed water to drain into the tray in the base. The rib-in-channel element is circular so that the bottle placement is universal, that is, it does not matter in what orientation the bottle valve is with respect to the drain, as the rib will actuate the valve and the channel will carry the condensate to the drain regardless of the rotational orientation of the bottle with respect to the base.

The side wall of the outer bottle may be perforated to reveal a transparent (e.g., glass) tube with a floating ball to indicate the level of water in the bottle. This glass tube is disposed in the gap between the inner and outer bottles, and the glass tube connects with the inner bottle at the base thereof.

In the preferred embodiment, the heater is located in a sealed recess in the bottom of the bottle and projects into the interior of the water reservoir, with a relatively large surface area for rapid heating of water filled into the bottle. The heater is powered to get a fresh, cold water charge up to temperature quickly, and when the temperature sensor in series in its power circuit reaches a preset level, the heater trims, that is, it cycles ON and OFF to maintain the temperature at a predetermined, near boiling level. A second temperature sensor is provided associated with the heater coil to sense if it goes into an over temperature condition, in which case it cuts OFF power to the heating element.

In addition, the heater circuit includes a push button type power switch that has an integrated ON light (e.g., red or green LED). When the button is pushed to turn the power to the base ON, the LED lights up to notify the barber/cosmetician that the unit is powered. In addition, the bottle preferably includes a water temperature indicator light (e.g., green or/and red LED). In a first, simplest implementation embodiment, the bottle light comes on and says on as the water is being heated. Once the temperature is sensed and the sensor switch opens the circuit when the water temperature is reached, the light goes off. Conversely, in a second embodiment, the water temperature ready light (green or/and red LED), is of the normally closed type, so that when the water in the bottle reaches the predetermined maximum, the ready light becomes lit, so the barber knows the water is hot enough to spray. This water temperature light can be a dual color LED, e.g. a yellow light when the water is being heated and still too cool to use, and green when the water is at the proper temperature. When the power is cut off upon the water temperature rising above the preferred range, the ready light in the bottle is also turned off.

Thus, one skilled in the art will readily understand that a wide range of condition lights and suitable circuits can be used to indicate any desired functional state of the power base and the bottle. For example, the light can be yellow when the water is being heated but not hot enough to be used, green when at proper operating temperature, and red when at over temperature, that is, when the power is shut off to permit the water to cool down. Likewise, the power base light can be green for ON and red for OFF (no power, but plugged in.

The in-circuit temperature sensor(s) also function as limit switches, opening as the selected set-point Temperature is reached, preventing overheating. The base optionally includes a separate ON-OFF switch, a power ON light, and optionally, a dial type resistive temperature control permitting user adjustment of the water temperature, but having a maximum power draw limit so the water never reaches boiling.

Preferably, the bottle includes a water reservoir section which comprises the spaced, mating inner and outer bottles, and a single walled power unit housing section, typically cylindrical, in which the male electrical connector and the heater elements are disposed. This section may be a screw-on section that permits removal for maintenance or replacement of the components.

In a first embodiment, the bottle may be of stainless steel. In an alternate embodiment, the bottle is constructed of a high temperature resistant plastic, such as polycarbonate, or high molecular weight, high density, polyethylene, polypropylene or a polyolefin copolymer.

BRIEF DESCRIPTION OF THE DRAWINGS

The invention is described in more detail with reference to the drawings, in which:

FIG. 3B is an isometric enlarged view of the bottle from the perspective of the base showing the recess for the heater boss of the power base, and the condensate valve;

FIG. 5B is an enlarged section view of the condensate valve assembly in the base of the spray bottle sub-assembly;

FIG. 5C is an enlarged section view of the condensate return channel and the condensate collection tray in the power base.

DETAILED DESCRIPTION, INCLUDING THE BEST MODES OF CARRYING OUT THE INVENTION

The following detailed description illustrates the invention by way of example, not by way of limitation of the scope, equivalents or principles of the invention. This description will clearly enable one skilled in the art to make and use the invention, and describes several embodiments, adaptations, variations, alternatives and uses of the invention, including what is presently believed to be the best modes of carrying out the invention.

In this regard, the invention is illustrated in the several figures, and is of sufficient complexity that the many parts, interrelationships, and sub-combinations thereof simply cannot be fully illustrated in a single patent-type drawing. For clarity and conciseness, several of the drawings show in schematic, or omit, parts that are not essential in that drawing to a description of a particular feature, aspect or principle of the invention being disclosed. Thus, the best mode embodiment of one feature may be shown in one drawing, and the best mode of another feature will be called out in another drawing.

All publications, patents and applications cited in this specification are herein incorporated by reference as if each individual publication, patent or application had been expressly stated to be incorporated by reference.

Figure 1:
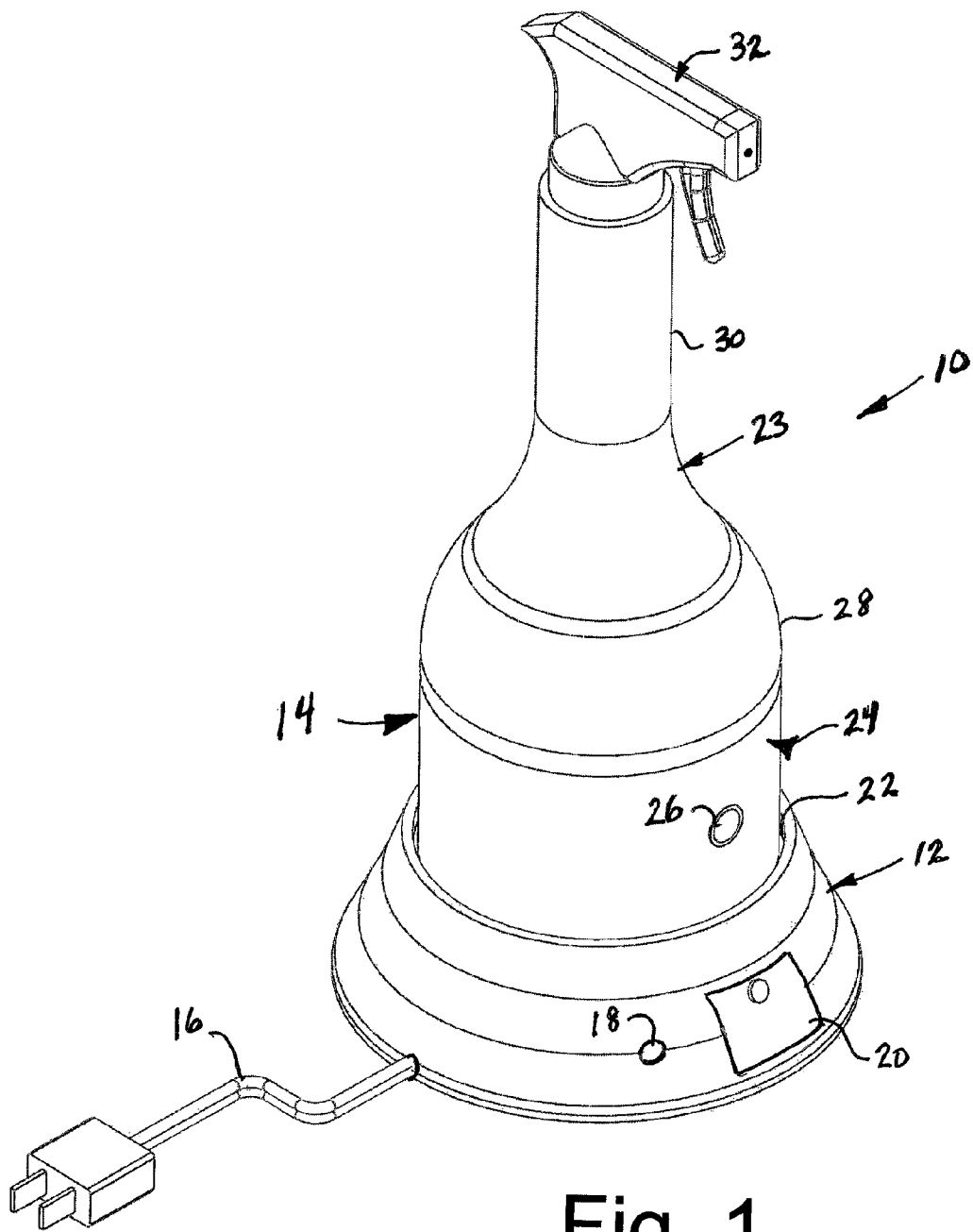
FIG. 1 is an isometric view of the inventive spray bottle and power base in the parked position ready to be heated or awaiting use at temperature.

FIG. 1 is an isometric view of the inventive heated spray bottle 10, comprising a power base assembly 12 onto which is parked an insulated spray bottle assembly 14 in position ready to be heated or awaiting use at temperature. The power base includes a mains power supply cord 16, a push-type power-ON button with optional integrated light 18, a slide-out condensate recovery drawer 20 and a recess 22 for receiving the spray bottle 14.

Figure 2:
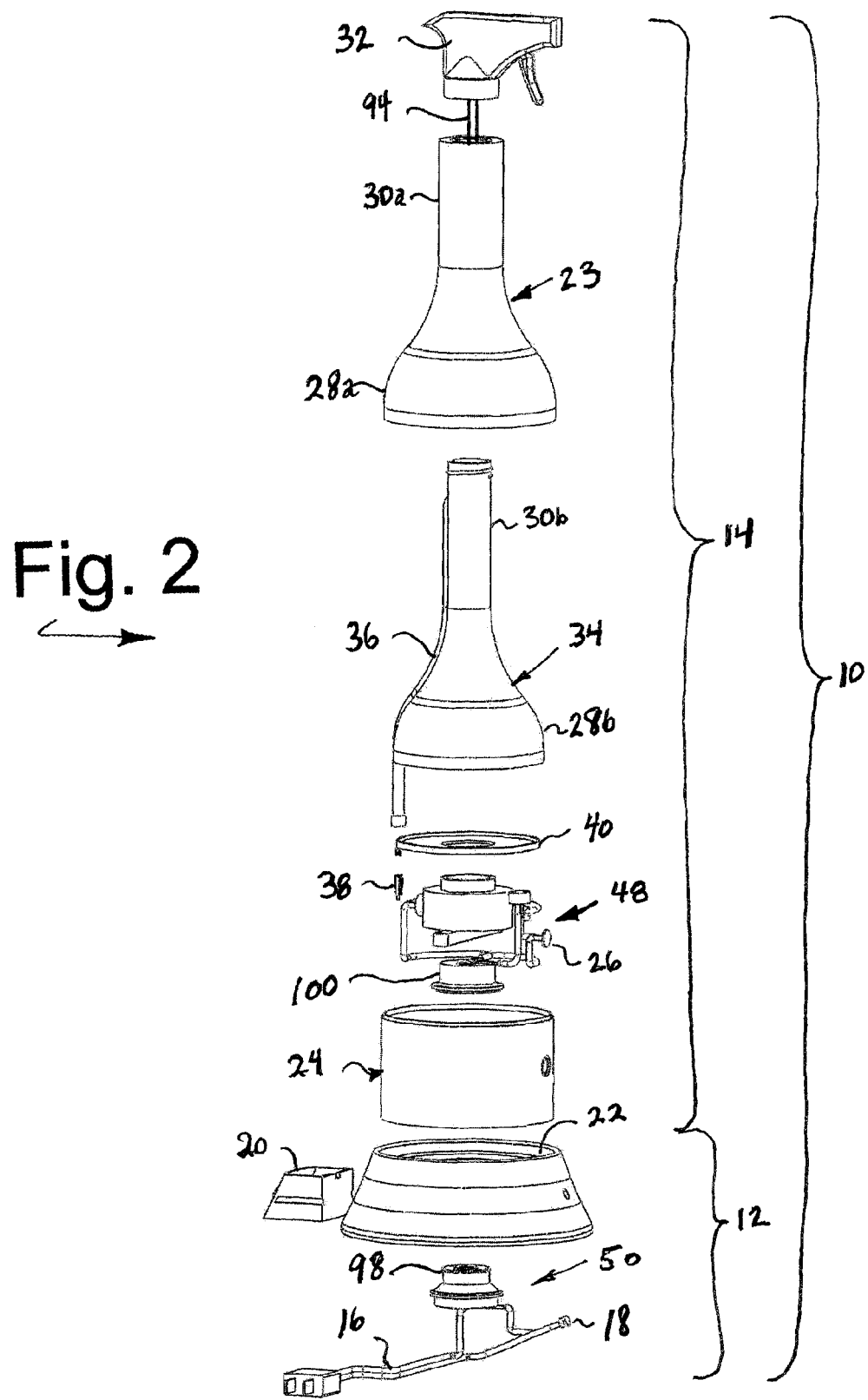
FIG. 2 is an exploded isometric view of the spray bottle components and the power base unit.

The bottle assembly 14 includes a cylindrical, single walled electrical component housing 24 in which is located the electrical wiring, connectors, sensors and lights, and the heater (best seen as 48 in FIG. 2). Projecting through the housing wall 24 is an "at temperature" signal light 26 (ready light). Atop the heater base 24 is a double-walled bottle section 23, comprising an inverted, "trumpet bell" or "wineglass"-shaped water reservoir section 28 that tapers upwardly into an elongated, cylindrical neck section 30. The elongated neck 30 is sized to be vertically long enough to function as a handle for the bottle, the length being sufficient, e.g. on the order of 5"-7", to accommodate a man's hand. Threaded atop the neck is a manual pump-type, directional trigger-type sprayer 32 (having an internal dip tube, not shown). Together, the power base 12 and the bottle 14 heat water in the bottle reservoir 28 to a selected heat, typically near, but short of boiling, so that the bottle may be removed from the base and brought by the professional to the point of use for manual spray as needed in the particular process being done.

FIG. 2 is an exploded isometric view of the inventive heated spray bottle assembly 10 showing the components of the power base unit 12 and the removable spray bottle assembly 14. The parts numbers are as in FIG. 1. Internal of the outer, inverted wineglass-shaped water reservoir section 23 is a correspondingly tapered and smaller inner water container assembly 34 which includes a vapor and condensate return (recycle) tube 36 that follows the surface contour of the neck 30a/30b and wineglass shape 28a/28b. The difference in size of the inner assembly 34 compared to the outer housing 23 forms an intermediate space that provides sufficient thermal insulation of the outer surface of the outer bottle housing 23 permitting it to be handled, bare-handed, with safety, even though the contents are approximately at a boil (180-200° F.). While that insulation space (seen in FIG. 4A as element 60) is normally air filled, and may include a small exterior hole for pressure relief (not shown), it may be gas filled (e.g., $N_2$ gas), may be evacuated as in a thermos bottle, or filled with a temperature resistant foam, fiberglass or other insulating material.

The condensate return tube 36 extends below the base plate 40 of the inner water container 34 and the housing 24, and terminates in a valve assembly 38. The electrical heater components 48 are shown exploded upwardly out of the housing cylinder 24.

The base assembly 12 includes mains power connection circuitry 50, shown in this view exploded downwardly for visibility. The female power connector 98 projects upwardly from the center of the bottle-receiving recess 22 and engages the male connector 100 in the base of the housing section 24. In this exploded view, the condensate drawer 20 is shown removed from the base 12.

Figure 3A:
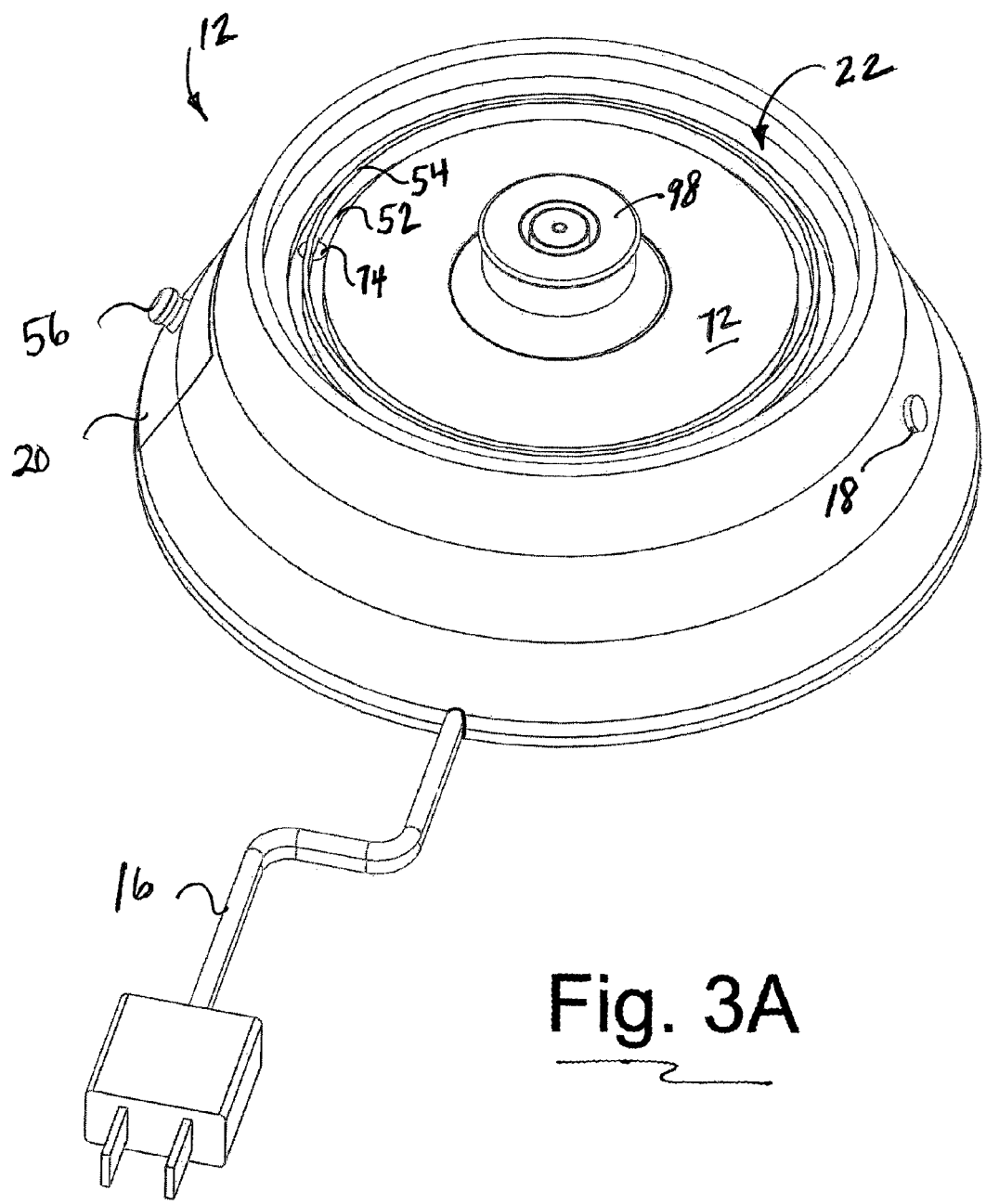
FIG. 3A is an isometric enlarged view of the base with the bottle lifted off to show the heater boss and condensate return channel.

FIG. 3A is an enlarged isometric view of the power base 12 with the spray bottle assembly 14 (not shown) lifted off to show the female mains power connector 98 (recess pin and ring-type) projecting upwardly through a hole in the power base recessed top 72. It mates with the male connector assembly 100 of FIG. 3B. A condensate channel (gutter) 52, disposed in the power base top 72, is formed as a ring adjacent to, but just inwardly of, the junction of the vertical inner wall of recess 22 with the outer margin of top 96. Positioned radially central of the channel 52 is a vertical rib 54 which actuates the valve 38 of the condensate recycle tube 36. The recycled condensed vapor drains through hole 74 into collection drawer 20. The condensate water collection drawer 20 includes a knob 56 for ease of removal and disposal of the collected water (or other solution).

FIG. 3B is an isometric enlarged view of the spray bottle sub-assembly 14 from the perspective of the underside, showing the base 70 of the heater electrical component housing 24 which includes male pin and ring-type connectors 44, 46, respectively disposed in a central recess 42. The recess fits over the projecting mains female connector element 98 in the power base 12. A pin/ring connector is used so that the orientation of the bottle 14 with respect to the base 12 is universal, that is, there is no specific, dedicated orientation in which the bottle has to be oriented with respect to the base to make connection between the mains power and the heater. Likewise, in a universal feature, the condensate valve 38 intersects the circular groove 86 that matingly receives the valve-actuating rib 54 of the power base 12. Screws 58 secure the heater housing bottom plate 70 to the housing cylinder 24, which in turn screws onto the bottom of outer bottle shell 23.

Figure 4A:
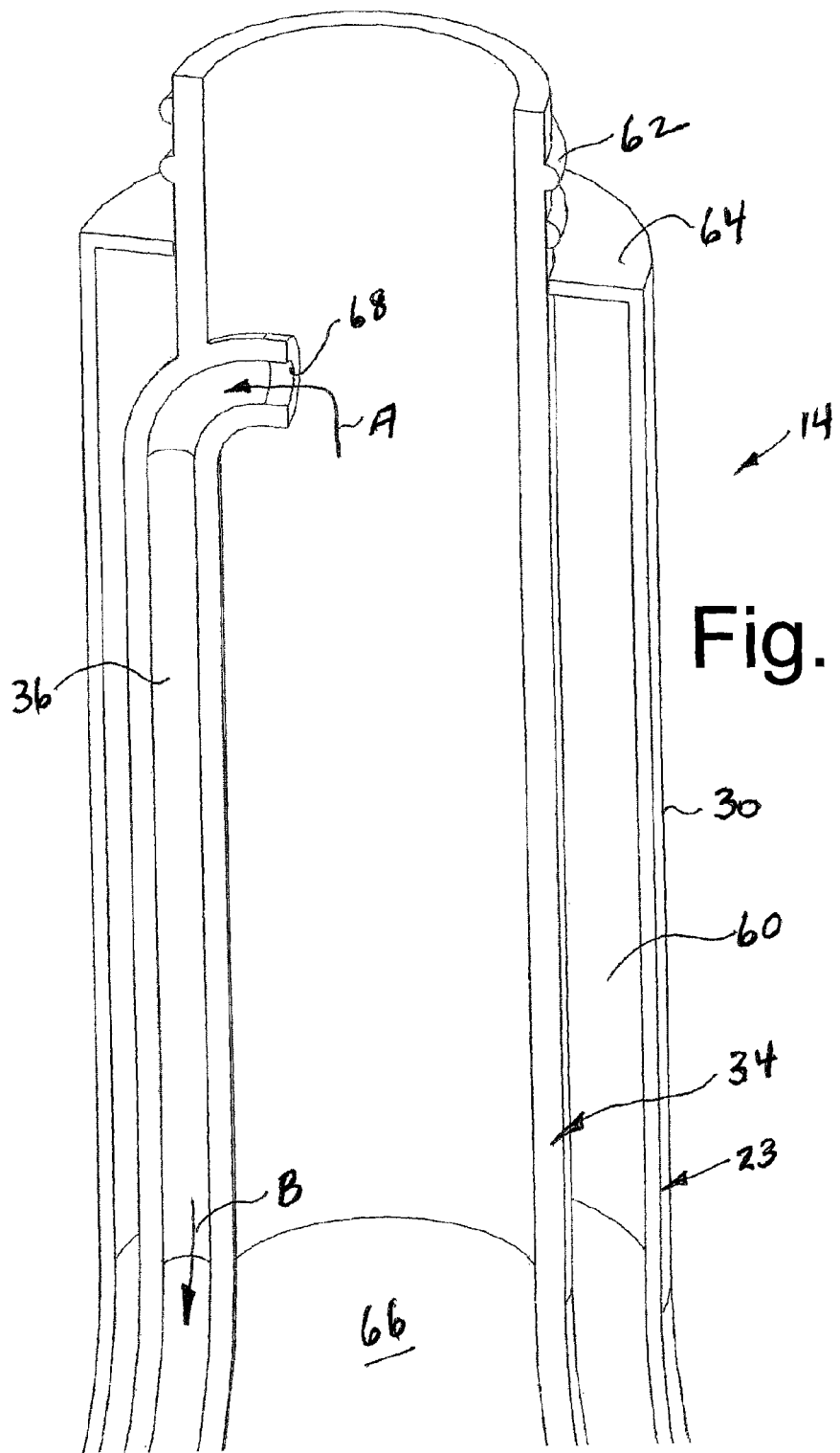
FIG. 4A is an enlarged section view of the upper half of the spray bottle sub-assembly.

FIG. 4A is an enlarged section view of the upper portion of the double-spray bottle sub-assembly 14, showing the inner shell 34 nested within the outer shell 23. The insulation space 60 is defined between the outer and inner shells 23/34. Note the threaded neck 62 of the inner shell 34 projects above a closure annulus 64 that sealingly bridges the two shells. The trigger spray assembly (not shown) 32 screws over those threads 62 and the dip tube 94 (see FIG. 1) fits down inside the water volume 66 of the inner shell 34. The vapor and condensate recycle tube 36 has an elbow and entrance 68 adjacent the top of the neck. The hot water and steam vapors enter the tube as shown by the Arrow A. The vapors cool and condense, then flow downwardly as shown by Arrow B.

Figure 4B:
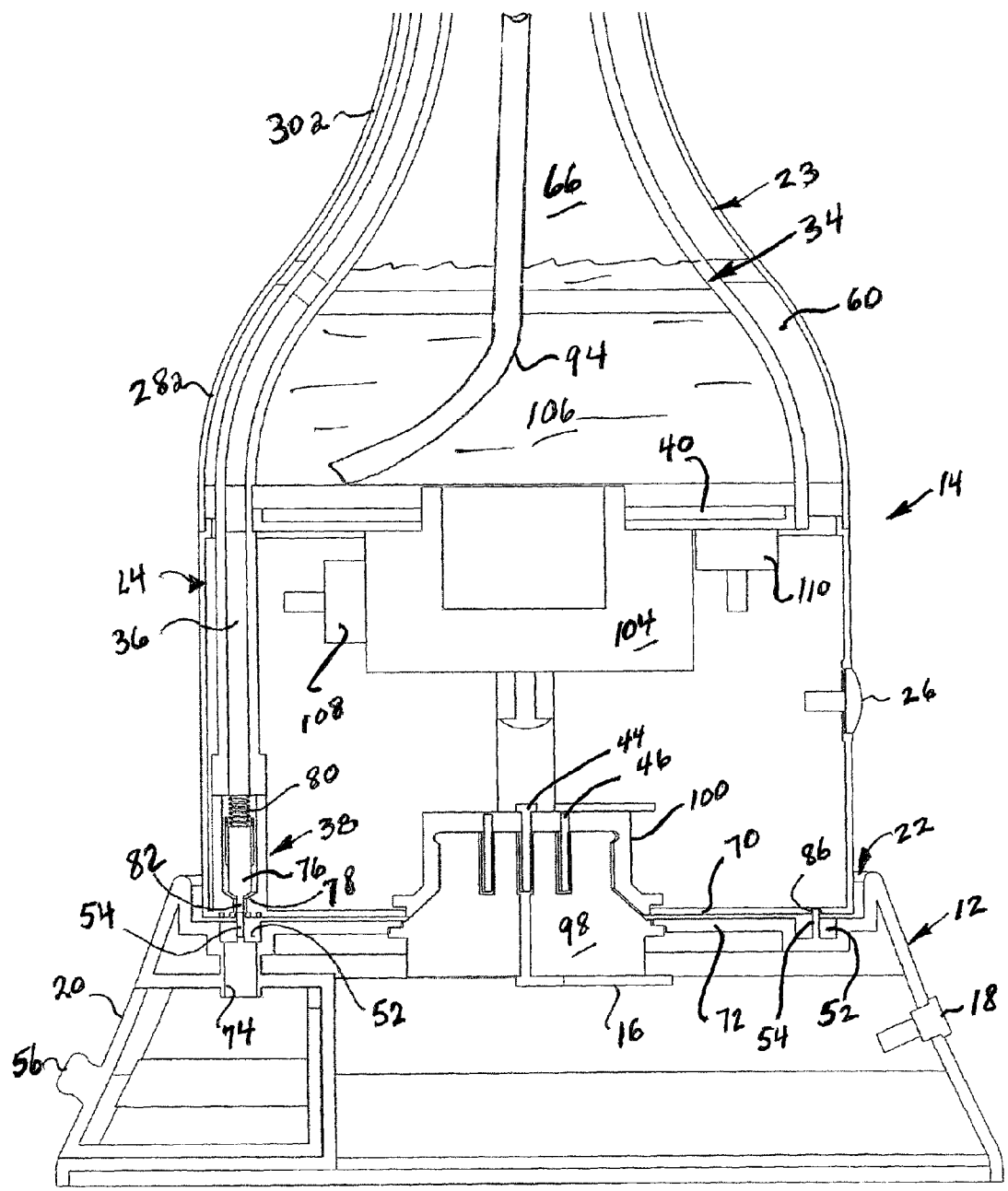
FIG. 4B is an enlarged section view of the lower half of the spray bottle sub-assembly as seated on the power base assembly.

FIG. 4B is an enlarged section view of the lower half of the spray bottle sub-assembly 14 as seated on the power base assembly 12. The base of the electrical heater component housing 24 is sealed with base-plate 70, which includes an aperture for the male connector assembly 100 to project up into the housing. It is shown mating with the female mains power connector 98 via the pin/ring connectors 44/46. Located above the male connector 100 are the heater coil assembly 104 and its associated over-temperature sensor/shut-off breaker 108. The water temperature sensor 110 is disposed to one side. The heater coil project through the base 40 of the inner bottle water reservoir 34, and the dip-tube 94 projects downwardly to one side to permit sucking up as much heated water as possible.

Located just inwardly from the outer circumference of the power base recess top 72 and molded into that top is a condensate gutter or channel 52. That gutter 52 communicates with a drain 74 that funnels into the volume of the condensate catchment drawer 20. On the left is the spring-biased valve assembly 38 disposed in the bottom of the condensate tube 36. A circumferential rib 54 is molded centrally of the gutter 52. The rib 54 projects upwardly, and the top margin of the rib contacts the projecting stem 82 of the push-valve body 76 that is normally biased downwardly against seat 78 by spring 80. When the bottle 14 is place in the recess 22 of base 12, the fin contacts the valve body 76, pushes it up against the spring 80 and opens the valve to permit condensate in tube 36 to flow into the gutter 52, and thence into the catchment tray 20 via drain 74.

As noted in FIGS. 3A and 4B, the side walls of the base 20 are sloped outwardly for added stability. However, as one skilled in the art will appreciate, a wide variety of base designs may be implemented within the scope of the principles of the invention. For example, where the footprint of the inventive spray bottle heater system is desired to be kept small, the spray bottle can be reconfigured vertically taller but smaller in diameter while maintaining the same volume, and the base assembly side walls can be vertically straight, rather than sloped outwardly.

Figure 5A:
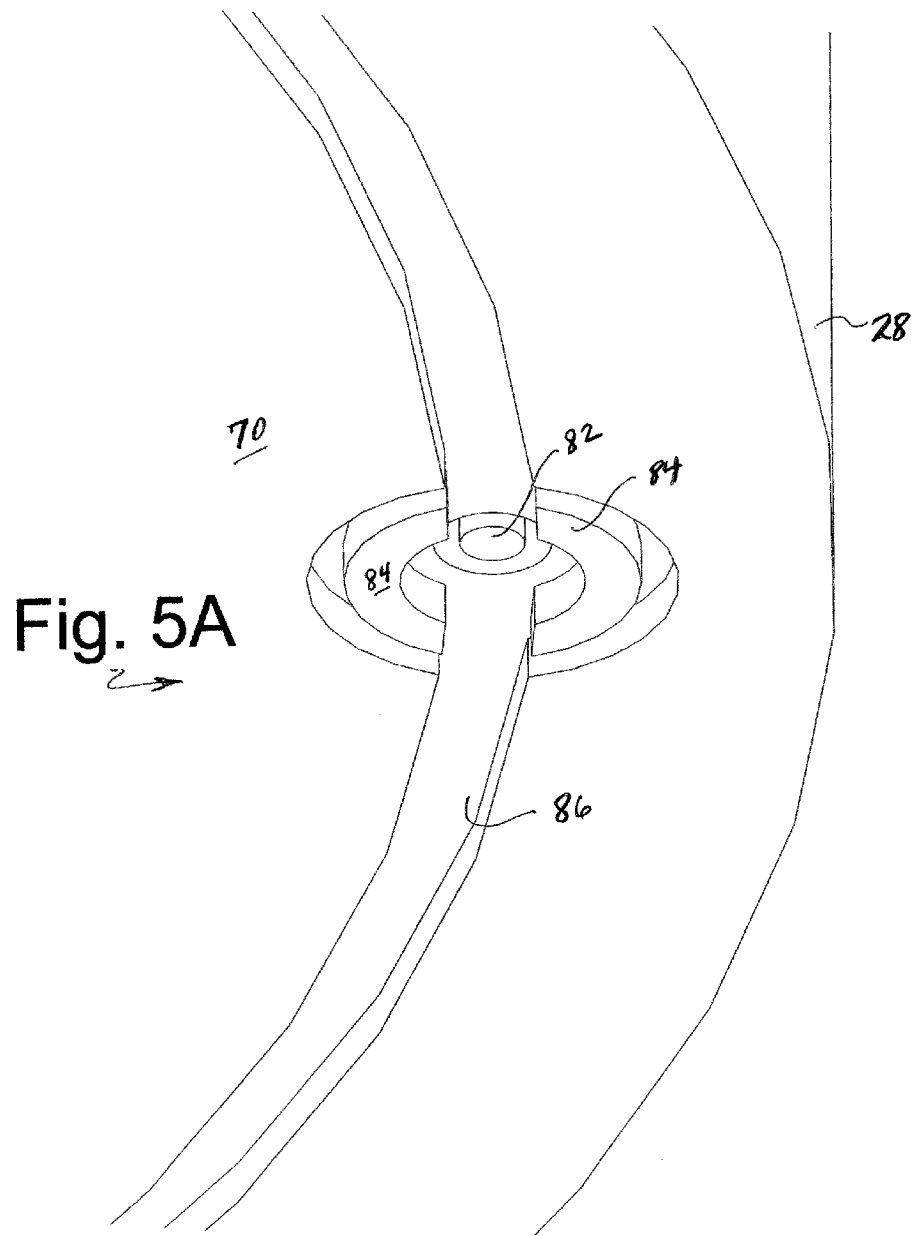
FIG. 5A is an enlarged isometric view of the underside of the spray bottle sub-assembly showing the condensate valve for release of condensate into the condensate return channel.

FIG. 5A is an enlarged isometric view of the underside of the spray bottle sub-assembly 14 showing the stem 82 of the condensate valve body 76 (FIG. 4B) for release of condensate into the condensate return channel. 52. In this embodiment, the lower portion of the valve sleeve 84, in which the valve seat 78 is formed (see FIG. 4B) terminates flush with the bottom floor 70 outer surface. Both the floor 70 and the valve collar 84 include a slot 86 that is a bit wider than the rib 54. The slot serves to center the bottle over the rib 54 so that the rib contacts, and pushes upwardly, the valve body stem 82. The circular, slotted collar 84 provides a port for channeling the condensate into the gutter 52.

FIG. 5B is an enlarged section view of the condensate valve assembly 38 in the base of the spray bottle sub-assembly 14 as the valve stem 82 is lifted by the rib 54, opening the valve body 76 off the seat 78, and permitting condensate to flow through port 88 into the channel 52.

FIG. 5C is an enlarged section view of the condensate return channel 52 and the condensate collection tray 20 in the power base 12. The rib 54 includes a relieved notch 90 in the area of the drain 74 to assist in letting condensate flow out of the channel 52 into the drain 74 as shown by Arrow C, and thence into the tray 20 as shown by arrow D. From time to time the drawer is removed and the collected condensate 92 disposed-of.

Figure 6A:
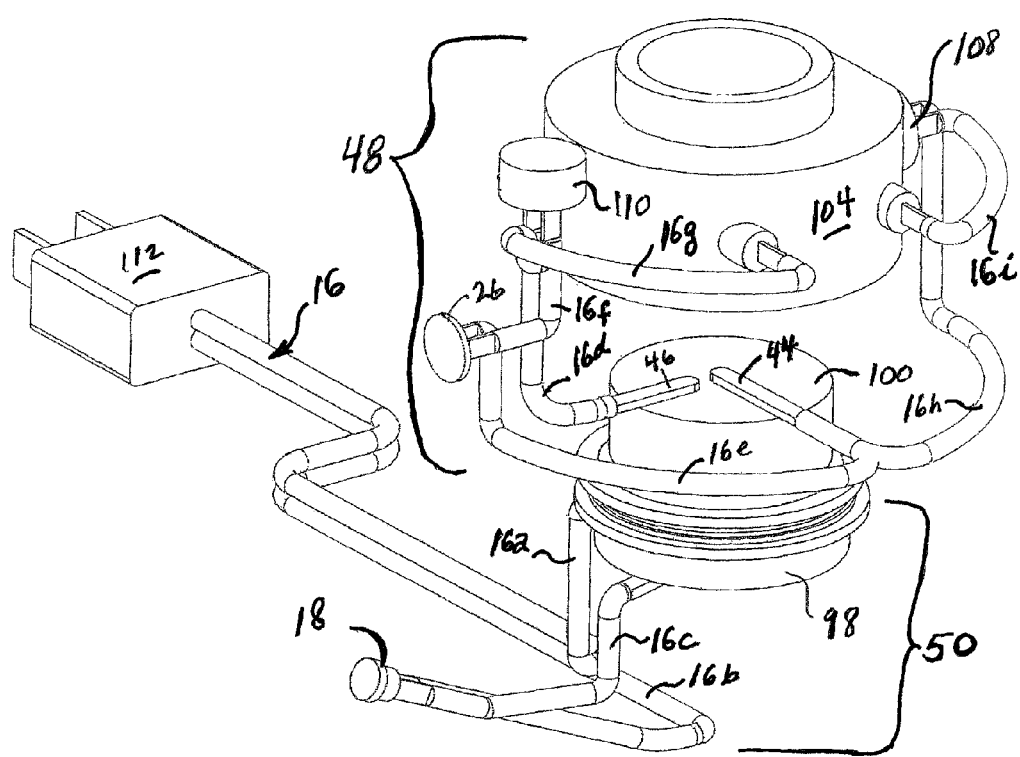
FIG. 6A is an enlarged elevated isometric of the electrical wiring, connectors, sensors, lights and heater elements.
Figure 6B:
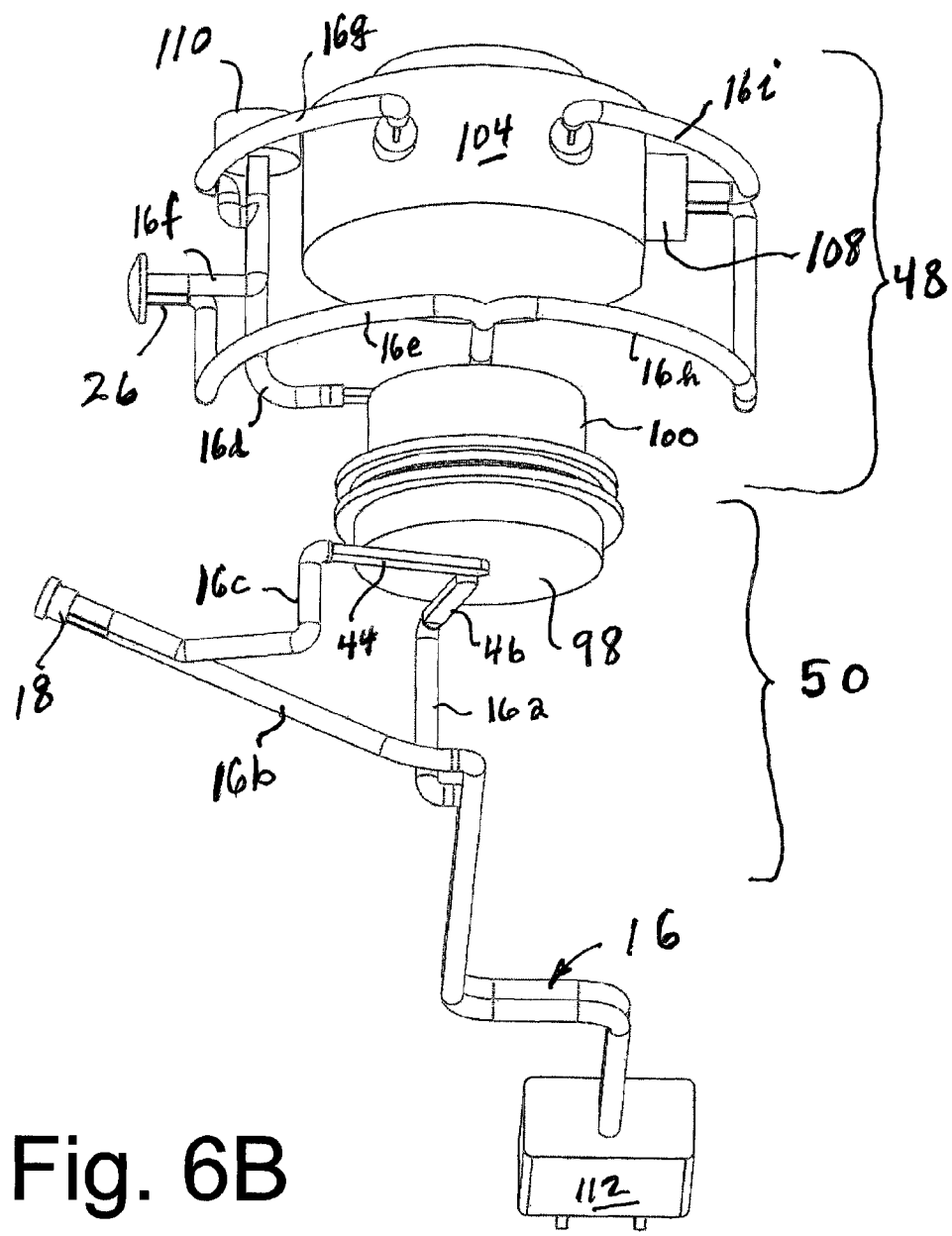
FIG. 6B is an enlarged bottom isometric of the electrical wiring, connectors, sensors, lights and heater elements.
Figure 6C:
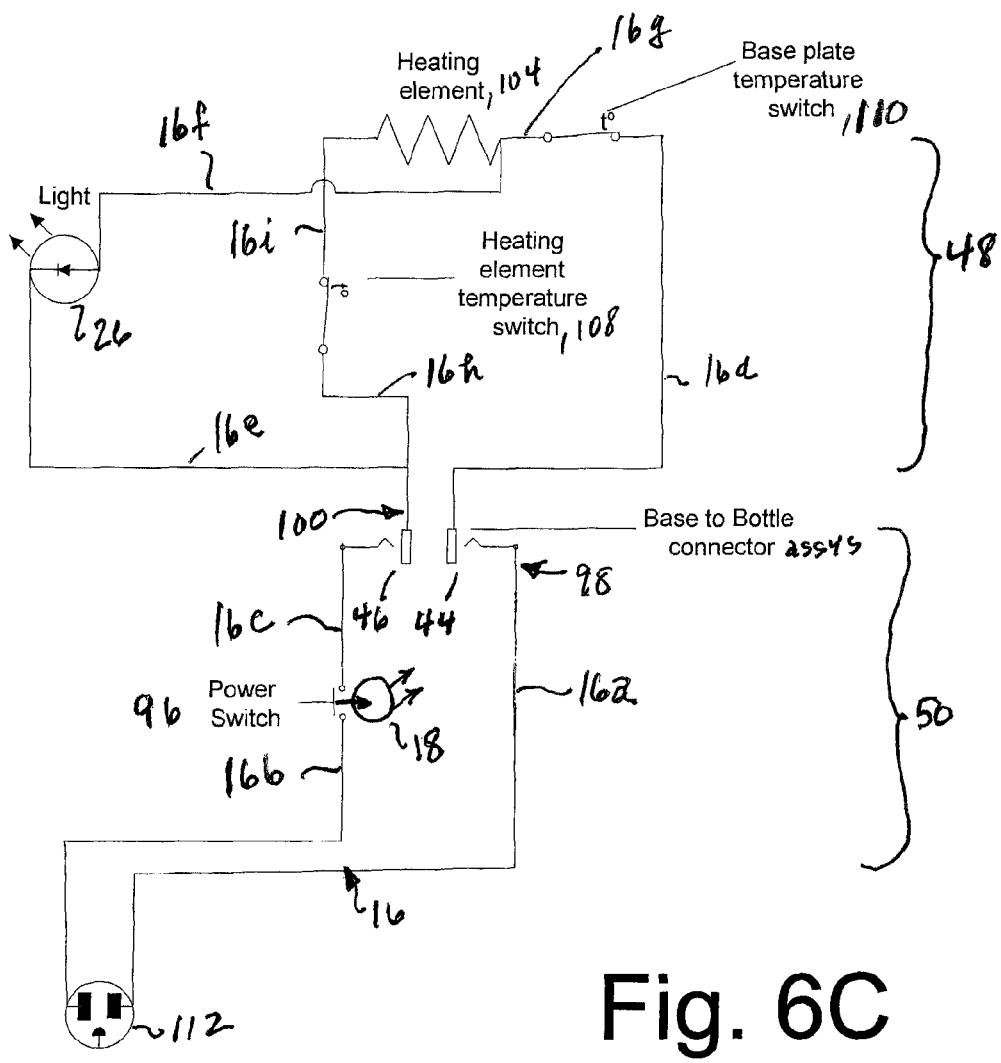
FIG. 6C is an electrical circuit schematic of the circuitry of the power base and spray bottle heater elements.

FIGS. 6A through 6C should be considered together, with FIGS. 6A and 6B showing the physical elements and leads in isometric, the parts being numbered as described above in connec-tion with FIGS. 1-5C. The main plug 112 connects via external power cord 16 to the base. Internal to the power base, one lead 16a goes to the ring element 46 of the female connector assembly 98. The other lead 16b goes to the dual-function, push-button/LED power-ON light 18, and from there the lead 16c goes to the pin 44 of the female connector assembly 98. An optional, separate power switch 96 (not shown in FIGS. 6A/6B) is conveniently located in the power base side wall 12; that is the dual function push-button LED 18 can be separated into two elements, switch 96 and power ON indicator light 18. The wiring and connection leads 44 and 46 to the female pin/ring connector 98 are best seen in FIGS. 6B and 6C. The male pin ring connector 100 with take off leads 44 and 46 are best seen in FIG. 6A.

The heater electrical assembly 48 located in the bottle housing section 24 comprises the male connector 100 in series with the heater temperature switch 108, the heater coil 104, the water temperature switch 110 and the ready light 26. Lead 16d takes off the ring contact 46 and goes to the water temperature switch 110, and from there lead 16g goes to the heater coil 104. The lead from the pin contact 44 is split in parallel, lead 16e going to the ready light 26 and from there lead 16f goes to the other side of the water temperature switch 110. The other branch 16h goes to the heater over temperature switch 108, and from there lead 16i provides the other power lead to the electrical heating element 104.

FIG. 6C is an electrical circuit schematic of the power base and spray bottle heater electrical components of FIGS. 6A and 6B, the parts numbering being keyed to the parts as described above. As shown the heater is not powered when the bottle is removed from the power base, and by the pin/ring connector and the temperature sensors the bottle placement is not required to be in a dedicated orientation, and there can be no overheating, an important safety factor. In addition, by the height of the electrical component housing, the hot water is spaced above the base 70 such that the bottle can be placed down on a counter, rather than on the base, if need be, without danger of burning the countertop.

INDUSTRIAL APPLICABILITY

It is clear that the inventive spray bottle heater assembly of this application has wide applicability to the cosmetology field, namely to barbers and hair salons. It provides continuously heated water at the proper temperature for hot spray styling without burning or chilling the customer. The inventive system clearly offers improved delivery of properly heated water spray, coupled with safety features for both the hair stylist and the customer. In addition, the bottle placement on the power base is universal, in that special orientation of the bottle is not required. Thus, the inventive system has the clear potential of becoming adopted as the new standard for apparatus and methods of hot water spray styling. In addition, the hot water spray can be applied to ironing, cooking, decal application, general cleaning, removal of wall-paper, preparing of water color paper, and any other application where sprays of continuously heated water at a proper temperature are required.

It should be understood that various modifications within the scope of this invention can be made by one of ordinary skill in the art without departing from the spirit thereof and without undue experimentation. For example, the bottle volume and configuration can have a wide range of designs to provide the functionalities disclosed herein. Likewise the heater may be powered by rechargeable battery rather than from mains power. This invention is therefore to be defined by the scope of the appended claims as broadly as the prior art will permit, and in view of the specification if need be, including a full range of current and future equivalents thereof.

The invention claimed is:

1. A spray bottle heating assembly comprising in operative combination:
   a) a double-walled spray bottle assembly comprising an inner container defining a reservoir for fluid to be heated, said inner container being disposed within and spaced from an outer shell and having a transverse bottom wall, said outer shell and said inner container having generally the same configuration to provide an insulating space therebetween, said spray bottle assembly including an elongated upward extending neck of size configured to be easily handled by a user, a manual trigger-type sprayer removably securable to the top of said neck and having a dip tube extending down into said reservoir, said outer shell extending down below said transverse bottom wall of said reservoir and terminating in a transverse bottom wall to define a housing for a heater assembly between said transverse bottom walls of said outer shell and said reservoir;
   b) a heater assembly disposed in said housing comprising a heating element disposed in said transverse bottom wall of said inner container to provide heat to said fluid in said reservoir, an electrical contact assembly disposed in said transverse bottom wall of said housing, and including thermostatic control and temperature indicator circuitry;
   c) a vapor and water condensate tube disposed in the insulating space between said outer shell and said reservoir connected to an aperture at the upper end of the neck of said reservoir and extending to said transverse bottom wall of said outer shell, said condensate tube including a check valve assembly permitting drainage of condensate from said condensate tube when actuated;
   d) a base assembly having a transverse top recess for receivingly engaging said transverse bottom wall of said outer shell of said spray bottle, said transverse top recess includes a member for actuating said check valve so that said condensate drains from said condensate tube only when said spray bottle assembly is placed onto said transverse top recess, an electrical power supplying member having an ON/OFF switch, said transverse top recess includes an electrical contact assembly that matingly engages said electrical contacts of said heater assembly to provide power to said heater assembly when said electrical contacts are engaged and said electrical power supplying member is switched ON, and said base assembly includes a removable sump member for recovery of condensate fluid drained from said condensate tube.

2. A spray bottle heating assembly as in claim 1 wherein said base assembly includes a power-ON light to indicate when said electrical power supplying member is switched ON.

3. A spray bottle heating assembly as in claim 2 wherein power is supplied as at least one of line power and rechargeable battery power, and wherein rechargeable battery power is supplied, said base assembly includes battery recharging elements and circuitry.

4. A spray bottle heating assembly as in claim 2 wherein said heater assembly includes at least one thermocouple disposed to sense the heat of the fluid in said reservoir, and to cut power to said heating element in contact with fluid in said reservoir when said fluid heat exceeds a selected maximum, and to activate power to said heating element when said fluid heat exceeds a selected minimum.

5. A spray bottle heating assembly as in claim 4 wherein said heater assembly includes a ready light that illuminates when the fluid in said reservoir reaches a predetermined operating temperature of said fluid.

6. A spray bottle heating assembly as in claim 2 which includes an adjustable fluid temperature heating controller.

7. A spray bottle heating assembly as in claim 6, wherein said adjustable fluid heating temperature controller includes a user-operable temperature selector selected from at least one of a dial and an indexable temperature selector.

8. A spray bottle heating assembly as in claim 1 wherein said inner container is constructed of stainless steel, and the fluid to be heated is water.

9. A spray bottle heating assembly as in claim 1 wherein said removable sump member comprises a drawer configured to fit in said base assembly that can be removed for dumping of condensate collected therein.

10. A spray bottle heating assembly as in claim 1 wherein said check valve includes a downwardly projecting stem and said base assembly includes a circumferential drain channel disposed in said transverse top recess, said circumferential drain channel including an upstanding rib, said upstanding rib actuating said stem to lift said check valve off its seat in said condensate tube to drain water into said circumferential drain channel, and said circumferential drain channel includes an aperture communicating with said removable sump member, said drain channel upstanding rib being configured to engage said stem regardless of the orientation on which said spray bottle assembly is placed into said transverse top recess of said base.

* * * * *